United States Patent [19]

Helmstetter

[11] Patent Number: 5,246,495

[45] Date of Patent: Sep. 21, 1993

[54] MATERIAL FOR IMPROVING THE STRENGTH OF CEMENTITIOUS MATERIAL

[75] Inventor: Jack G. Helmstetter, Brick, N.J.

[73] Assignee: Loc Systems, Ltd. (LP), Lavelette, N.J.

[21] Appl. No.: 846,052

[22] Filed: Mar. 5, 1992

[51] Int. Cl.$^5$ ............................................. C04B 14/04
[52] U.S. Cl. .................................... 106/600; 106/603; 106/2; 106/14.21; 106/14.44; 252/383; 264/DIG. 43
[58] Field of Search ................ 252/383, 400.3, 400.31, 252/400.62; 264/DIG. 43; 106/600, 603, 2, 14.21, 14.44

[56] References Cited

U.S. PATENT DOCUMENTS 4,153,591  5/1979  Yoshida et al. .................. 260/29.65
4,295,899  10/1981  Oppen .................................. 148/6.16
4,656,005  4/1987  Arpin .................................. 252/383

OTHER PUBLICATIONS

"Curing Modern Concrete Reads" Philadelphia Quartz Company Bulletin 31 (1937) pp. 3-5.

Primary Examiner—Mark L. Bell
Assistant Examiner—Paul Marcantoni
Attorney, Agent, or Firm—Stephen W. White

[57] ABSTRACT

A novel and stable solution that can be applied on already existing cementitious structures or mixed with the cementitious matter prior to casting, is described. This solution is a simple, stable and environmentally safe material containing a sodium silicate, a dispersing agent and water containing a polysiloxane. Structures that have this material coated thereon or mixed therewith exhibit significant resistance to water penetration and resulting corrosion of re-bar elements and spalling of the concrete.

8 Claims, No Drawings

MATERIAL FOR IMPROVING THE STRENGTH OF CEMENTITIOUS MATERIAL

BACKGROUND OF THE INVENTION

1. Field of the Invention

This invention relates to materials that can be applied to or added with cementitious matter to improve the strength and resistance to deterioration thereof. Still more particularly, this invention relates to a material which when added to cementitious matter containing reinforcing therein, will subsequently prevent and delay the corrosion thereof. Even more particularly, this invention relates to materials which when used with cementious matter is safe to use and relatively harmless to the environment.

2. Discussion of the Prior Art

There is a pressing need in the construction industry to prevent corrosion due to time and pollution from occurring. For example, in road and bridge construction where vast amounts of reinforced concrete is poured, considerable damage occurs by road use and pollution. Additionally, in some areas of the world, areas where roads encounter snow and ice, considerable matter is applied to reduce said snow and ice conditions. Materials such as salts are commonly used to reduce these conditions. If the road bed or bridges have cracks and such within the material or surfaces, the salt and pollution can seep down inside the cementitious matter and reach the reinforcing (e.g. steel rods) imbedded therein. Corrosion thus occurs and this results in a "blooming" of the cementitious matter. This is highly undesirable and much repair work must take place when this happens.

Yet other cementitious material such as monuments, works of arts, tombstones, slate and tile roofs, remainders of antiquity and the like, will decay over time. It is desirable to be able to prevent this from happening and to preserve this matter as long as possible. Much of this corrosion or deterioration happens because of pollutants such as acid rain.

Conventional, cementitious (concrete) structures are commonly used throughout the world by the construction industry. Many of these structures use metal reinforcing materials (e.g. re-bar) to insure that the structural integrity is maintained. However, many of these structures undergo considerable corrosion when penetrated by deleterious chemical materials such as that found in air pollution or that applied to the surfaces of roads, bridges and the like to reduce the effect of ice and snow, for example. The corrosion products in and around the reinforcing steel causes cracks to develop in the cementitious material thus allow even more intrusion of these deleterious materials and acceleration of the subsequent corrosion. This corrosion is sometimes called "spalling" and tends to diminish the structural integrity of any reinforcing member placed therein. Eventually, complete failure of the concrete structure occurs. All of this is extremely undesirable within the construction industry and there is a long standing need to find methods for reducing or even eliminating these corrosion effects.

The use of silicates and related material for use in the coating of cementitious matter is well-known. These prior art references teach the use of particular ratios of potassium or sodium silicates, for example, to coat and water-proof already existing structures made from cementitious matter. Still other references teach the use of silicates for the encapsulation of contaminated or polluted matter that may include cementitious matter. Most of these prior art coatings are not particularly effective in preserving the cementitious matter on which they are applied. In fact, although most of these references do infer that some preservation is achieved, many fail miserably to attain the requisite levels so highly desired by the building industry.

Thus, it is a long sought-after goal to provide a safe, inexpensive and effective material that can be applied on or mixed with cementitious matter to prevent the aforesaid deterioration.

SUMMARY OF THE INVENTION

It is an object of this invention to provide a material which when mixed with or applied on cementitious matter will add strength thereto and provide the requisite resistance to deterioration. These and yet other objects are achieved in a solution to preserve and strengthen cementitious matter comprising a mixture of:

a. four parts by weight of a silicate solution of about 8 to 10% $Na_2O$ and about 25 to 35% $SiO_2$ and having a specific gravity of between 30° and 40° Baume and an organic surfactant; and, b. one part by weight of an aqueous solution containing from 0.0001% to 0.01% of a polyalkylene oxide modified polydimethylsiloxane.

DETAILED DESCRIPTION OF THE INVENTION

The material of this invention can be either mixed with the cementious matter as it is being formed or, alternatively, be applied on the cementitious matter itself or on the reinforcing metal inserted therein. Many of the prior art materials used to prevent corrosion on metal, for example, are in and of themselves environmentally unsafe. For example, zinc chromates are conventionally applied to various metals used within the construction industry. The chromates have been banned by the environmental agencies in many parts of the world since they cause deleterious effects to the flora and fauna. Other silicate mixtures have also been proposed to reduce the corrosion effects of the environment on metals. These work satisfactorily to reduce air-borne corrosion on metals exposed directly to the air. However, when imbedded in concrete, there is not enough interaction between the surface of the metal and the surrounding cementitious matter. The novel mixture of this invention will solve this problem.

In the practice of this invention, the aforementioned solution of silicate, wetting agent and polysiloxane can be mixed directly with the cement prior to the pouring thereof. For example, up to 10% by weight of the water used in the manufacture (mixing) of the cement, lime and sand, for example, may be replaced by the mixture of this invention. When used in this manner, the concrete has an enhanced water proofing surface and the horizontal and capillary movement of any water and intrusion is significantly reduced. Alternatively, the solution may be applied directly to a concrete structure itself and water proofing of the structure will also be achieved. However, by mixing the solution with the cement or by surface treating any metal reinforcing elements to be employed therewith, just prior to use, the bond between the cement and the metal reinforcing elements is greatly enhanced and a structure made in this manner will have greatly improved resistance to corrosion and spalling of the concrete itself.

Sodium silicates comprising about 8 to 10% of $Na_2O$ and about 25 to 30% $SiO_2$ are particularly effective within the ambit of this invention. These materials will have a specific gravity of between 30° and 40° Baume and are easily dispersed in aqueous solutions. I prefer adding an organic wetting agent in order to insure complete dispersion of the silicate. A particularly preferred wetting or dispersing agent is DOWFAX ® 2A1 Solution produced by Dow Chemical USA, Midland, Mich., 48674. This agent is an aqueous mixture of dodecyl (sulfophenyl) benzene sulfonic acid (disodium salt) and oxybis (dodecylbenzenefulfonic acid), (disodium salt) with minor amounts of sodium sulfate and sodium chloride contained therein. However, any convenient wetting or dispersing agent that will assist in the dispersing of the silicate in an aqueous medium, may be used as well.

Four parts by weight of the silicate (Part A) is then dispersed in one part by weight of water (Part B) which will contain from 0.0001% to 0.01% of a polyalkylene oxide modified polydimethylsiloxane. A particularly preferred polysiloxane is Silwet ™, manufactured by Union Carbide Chemicals & Plasics Co., Inc. Saw Mill River Road, Tarrytown, N. Y. 10591 e.g. UCAR ® Silwet Surfactant L76D2. There are a number of other polysiloxanes that will function and these are well-known to those skilled in the art.

In addition to the aforesaid ingredients, which are requisite to perform the function for which they were designed, certain other ingredients may be added for other purposes. For example, formamide may be added to thin out the solution and glycols such as ethylene glycol acetate and glycerol mono-, di- and triacetates added to impart a resistance to freezing when the solution is designed to be used under extreme conditions of cold. Various salts such as calcium or sodium chloride may be added to increase the requisite temperature range at which this solution may be used. In order to increase the surface tension, magnesium or aluminum sulfates or polyvinyl acetates may be added thereto. Hydrogen peroxide may be added to bleach colorants that may be present such as titanium dioxide or aluminum pigments. Chlorine may be added to kill bacteria present and to add to the life of the coating solution. Preservatives such as urea formaldehyde may also be mentioned herein. Borax may be added to enhance or to hasten the curing of this material when applied as a coating, for example. When curing agents are to be used, however, they should be added just before mixing the solution to prevent early curing of the material while still in the container, for example. The aforesaid ingredients are not a requisite part of the solution of this invention be may be added only if required to perform some specific function as described above.

In the preparation of a typical solution for addition to or application on cementitious matter, I simply mix the desired ingredients together thoroughly and then either add this mixture to the cement mix or apply to the surface of the cement after construction thereof. The application may be accomplished by any of the conventional and well-know techniques such as by spraying, brushing, etc. An aqueous sodium silicate material is readily available commercially from the PQ Corp., Valley Force, PA., as PQ OW3, for example. An organic dispersing or wetting agent is added and 4 parts by weight are then dispersed in 1 part by weight of water containing the polysiloxane. Other adjuvants, if desired, are then added and the solution is ready for use as described above. The liquid silicate is a conventional, syrupy-like material highly soluble or dispersible in water.

As mentioned previously, the mixture of this invention can be either mixed with the cementious matter during manufacture or applied directly to the already constructed element. Additionally, the mixture of this invention can be used to coat the metal reinforcing elements employed during the construction. In any event, such uses will greatly enhance the resistance of the cementitious matter, either alone or reinforced, to corrosion or spalling or other deleterious effects caused by the environment, for example. When used or mixed with the cement during the manufacture thereof, about 10% of the normal water used can be displaced by the mixture of this invention. It is not a critical amount but should be there in sufficient quantity to perform the function of corrosion resistance and water proofing. If sprayed or coated on already existing structures a sufficient amount of the material of this invention should be applied to insure penetration of the surface thereof.

In a typical example, the solution of this invention was prepared and mixed in with concrete displacing about 10% of the normal water used by the solution of this invention. This concrete was used to prepare a simulated wall structure using standard, commercially available iron re-bar reinforcing rods therein. When this structure was exposed to an accelerated test of corrosion, virtually no corrosion or spalling occurred while that structure made without the solution of the invention (control) failed miserably. The accelerated test represented 55 years of exposure to corrosion. The control element would have decayed in less than 10 years while the example lasted the full time.

In yet another example, a simulated concrete wall structure was coated with the solution of this invention. When exposed to water—even to water containing large amounts of salt—the wall exhibited an enhanced resistance to water penetration while a control showed considerable water penetration and considerable corrosion.

The solution of this invention is easy to manufacture and apply and can be used in road and bridge construction as well as in the construction of various buildings and the like. Additionally, this solution can be used over already existing structures to enhance the water proofing thereof and reduce the effects of corrosion and spalling. Enhanced structure life is thus possible. Finally, the solution of this invention is environmentally safe and easy to use and will replace a number of other elements used to prevent corrosion and the like—elements that do not function as well and are environmentally unsafe.

I claim:

1. A solution to preserve and strengthen cementitious matter comprising a mixture of:
    a. four parts by weight of an aqueous silicate solution of about 8 to 10% $Na_2O$ and about 25 to 35% $SiO_2$ and having a specific gravity of between 30° and 40° Baume and an organic surfactant; and,
    b. one part by weight of an aqueous solution containing from 0.0001% to 0.01% of a polyalkylene oxide modified polydimethylsiloxane wherein parts A and B represent five total parts of the solution.

2. The solution of claim 1 wherein said silicate solution is 9.1% $Na_2O$ and 29.5% $SiO_2$ and has a specific gravity of 42.2° Baume.

3. The solution of claim 1 wherein said organic surfactant comprises a mixture of dodecyl (sulfophenoxy) bezenesulfonic acid, disodium salt, and oxybis (dodecylbenzenesulfonic acid), disodium salt.

4. The solution of claim 1 wherein a curing amount of 5% borax in water is added thereto just prior to use.

5. The solution of claim 1 wherein said cementitious matter is taken from the group consisting of cement, reinforced cement, cement block, brick and tile.

6. The solution of claim 5 wherein said reinforcing material is iron.

7. A process for enhancing the resistance of cementitious matter to water and corrosion comprising the steps of mixing said cementitious matter with the solution of claim 1 prior to casting said cementitious matter in a form.

8. A process for enhancing the resistance of constructed cementitious matter to water and corrosion wherein the solution of claim 1 is topically applied thereon.

* * * * *